(12) United States Patent
Kurokawa et al.

(10) Patent No.: US 12,199,497 B2
(45) Date of Patent: Jan. 14, 2025

(54) GATE DRIVING POWER SOURCE FOR BIDIRECTIONAL STEP-UP/DOWN CONVERTER

(71) Applicant: Hitachi Astemo, Ltd., Hitachinaka (JP)

(72) Inventors: Kazunari Kurokawa, Oyama (JP); Tao Trong Bui, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 308 days.

(21) Appl. No.: 17/637,499

(22) PCT Filed: Sep. 11, 2020

(86) PCT No.: PCT/JP2020/034424
§ 371 (c)(1),
(2) Date: Feb. 23, 2022

(87) PCT Pub. No.: WO2021/060014
PCT Pub. Date: Apr. 1, 2021

(65) Prior Publication Data
US 2022/0294334 A1 Sep. 15, 2022

(30) Foreign Application Priority Data
Sep. 24, 2019 (JP) .................................. 2019-173306

(51) Int. Cl.
*H02M 1/08* (2006.01)
*H02M 3/335* (2006.01)
*H02M 3/158* (2006.01)

(52) U.S. Cl.
CPC ............. *H02M 1/08* (2013.01); *H02M 3/335* (2013.01); *H02M 3/1582* (2013.01)

(58) Field of Classification Search
CPC ..................................................... H02M 1/08
See application file for complete search history.

(56) References Cited

U.S. PATENT DOCUMENTS

2006/0103341 A1* 5/2006 Steigerwald ........ H02M 3/1582
318/712
2009/0174353 A1 7/2009 Nakamura et al.
(Continued)

FOREIGN PATENT DOCUMENTS

JP  2009130967 A  6/2009
JP  2010154581 A  7/2010
(Continued)

OTHER PUBLICATIONS

International Search Report for International Application No. PCT/JP2020/034424; Date of Mailing Dec. 8, 2020.
(Continued)

*Primary Examiner* — Peter M Novak
(74) *Attorney, Agent, or Firm* — CANTOR COLBURN LLP

(57) ABSTRACT

A gate driving power source device individually supplies a DC power source to a plurality of gate drive circuits provided for a power conversion device. The power conversion device includes a step-up/down converter and one or a plurality of AC/DC conversion circuits. The step-up/down converter includes a step-up/down upper arm switching element and a step-up/down lower arm switching element. The AC/DC conversion circuit includes an AC/DC upper arm switching element and an AC/DC lower arm switching element. The gate driving power source device includes a power source unit that supplies a shared DC power source to at least two of the step-up/down upper arm switching element, the step-up/down lower arm switching element, the AC/DC upper arm switching element, and the AC/DC lower arm switching element.

4 Claims, 7 Drawing Sheets

(56) References Cited

U.S. PATENT DOCUMENTS

2011/0058400 A1 3/2011 Fukuta et al.
2011/0242864 A1 10/2011 Satou
2015/0364984 A1 12/2015 Miyauchi et al.
2017/0033710 A1* 2/2017 Muto .................... H02M 7/537

FOREIGN PATENT DOCUMENTS

JP 2011083179 A 4/2011
JP 2016001960 A 1/2016

OTHER PUBLICATIONS

PCT Written Opinion of the International Searching Authority for International Application No. PCT/JP2020/034424; Date of Mailing Dec. 8, 2020.

* cited by examiner

GATE DRIVING POWER SOURCE FOR BIDIRECTIONAL STEP-UP/DOWN CONVERTER

CROSS REFERENCE TO RELATED APPLICATIONS

This is the U.S. national stage of application No. PCT/JP2020/034424, filed on Sep. 11, 2020. Priority under 35 U.S.C. § 119 (a) and 35 U.S.C. § 365 (b) is claimed from Japanese Application No. 2019-173306, filed Sep. 24, 2019, the disclosure of which is also incorporated herein by reference.

TECHNICAL FIELD

The present invention relates to a power conversion system that generates a bidirectional buck/boost power flow.
Priority is claimed on International Patent Application No. PCT/JP2020/034424, filed on Sep. 11, 2020, which claims priority to Japanese Patent Application No. 2019-173306, filed Sep. 24, 2019, the content of which is incorporated herein by reference.

BACKGROUND ART

The following Patent Literature 1 discloses a motor control device which includes gate drive circuits driving switching elements of respective arms of an inverter circuit and a power supply circuit individually supplying power to each of the gate drive circuits of upper stage side arms (upper stage side gate drive circuits) and each of the gate drive circuits of lower stage side arms (lower stage side gate drive circuits) of the gate drive circuits. The power supply circuit in this motor control device includes a number of transformers according to the number (six) of gate drive circuits and individually supplies power to each of the gate drive circuits by rectifying an output of each transformer.

CITATION LIST

Patent Literature

Patent Literature 1

Japanese Unexamined Patent Application, First Publication No. 2009-130967

SUMMARY OF INVENTION

Technical Problem

Incidentally, the foregoing power supply circuit is a gate driving power source device including a power source generation circuit constituted of a transformer and a rectification circuit for each gate drive circuit and has a problem in that a mounting area (mounting volume) is comparatively large. For example, when a plurality of gate drive circuits driving a plurality of inverter circuits are mounted on one printed board, since the number of power source generation circuits required is that obtained by multiplying the number of phases of the inverter circuits by the number of inverter circuits, there is a problem that the size of the printed board will be large and the costs will be high.
The present invention has been made in consideration of the circumstances described above, and an object thereof is to provide a gate driving power source device having a mounting area (mounting volume) smaller than that in the related art.

Solution to Problem

In order to achieve the foregoing object, a gate driving power source device according to an aspect of the present invention supplies a DC power source to gate drive circuits of a power conversion device constituted of a step-up/down converter including a step-up/down upper arm switching element and a step-up/down lower arm switching element, and one or a plurality of AC/DC conversion circuits including an AC/DC upper arm switching element and an AC/DC lower arm switching element. The gate driving power source device includes a power source unit that supplies a shared DC power source to at least two of the step-up/down upper arm switching element, the step-up/down lower arm switching element, the AC/DC upper arm switching element, and the AC/DC lower arm switching element.

In the gate driving power source device according to the aspect of the present invention, the power source unit may supply the shared DC power source to the step-up/down lower arm switching element and one or a plurality of the AC/DC lower arm switching elements.

In the gate driving power source device according to the aspect of the present invention, the AC/DC conversion circuit may include a powering inverter which converts DC power input from the step-up/down converter into AC power and supplies the AC power to a load, and a regeneration converter which converts AC power that is an output of an AC generator into DC power and outputs the DC power to the step-up/down converter.

The gate driving power source device according to the aspect of the present invention may further include a second power source unit that supplies the shared DC power source to the step-up/down upper arm switching element and the AC/DC upper arm switching element.

In the gate driving power source device according to the aspect of the present invention, a control circuit controlling the power source unit, the second power source unit, and the gate drive circuit may be mounted on a single printed board such that the control circuit is sandwiched between the power source unit and the second power source unit.

In the gate driving power source device according to the aspect of the present invention, the printed board may be a multi-layer printed board in which pattern wirings are formed on at least both surfaces thereof. A step-up/down lower arm gate drive circuit driving the step-up/down lower arm switching element and an AC/DC lower arm gate drive circuit driving the AC/DC lower arm switching element, and the power source unit may be mounted with a rear/front positional relationship therebetween. A step-up/down upper arm gate drive circuit driving the step-up/down upper arm switching element and an AC/DC upper arm gate drive circuit driving the AC/DC upper arm switching element, and the second power source unit may be mounted with a rear/front positional relationship therebetween.

In the gate driving power source device according to the aspect of the present invention, the AC/DC conversion circuit may include the three-phase AC/DC upper arm switching element and the three-phase AC/DC lower arm switching element.

Advantageous Effects of Invention

According to the aspect of the present invention, it is possible to provide a gate driving power source device having a mounting area (mounting volume) smaller than that in the related art.

DESCRIPTION OF EMBODIMENTS

Hereinafter, with reference to the drawings, embodiments of the present invention will be described.

First Embodiment

Figure 1:
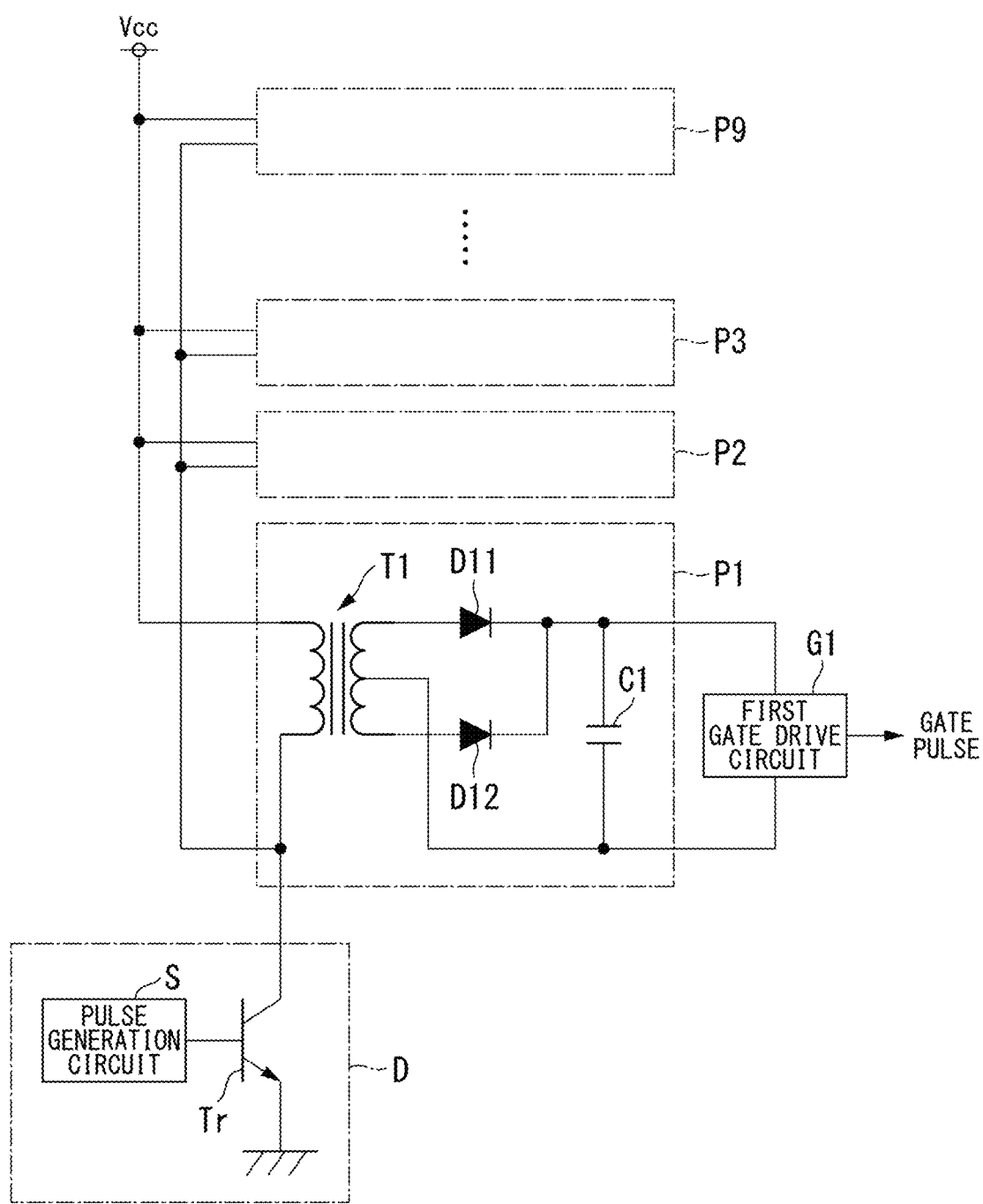
FIG. 1 is a circuit diagram illustrating a constitution of a gate driving power source device according to a first embodiment of the present invention.

First, a first embodiment of the present invention will be described. As illustrated in FIG. 1, a gate driving power source device according to the first embodiment includes first to ninth power source units P1 to P9 (nine) and a single power source drive circuit D. The first to ninth power source units P1 to P9 (nine) are DC power source circuits supplying a DC power source to first to fourteenth gate drive circuits G1 to G14 (fourteen in total) illustrated in FIG. 2. As illustrated in FIG. 1, input sides thereof are connected in parallel between an output end of the power source drive circuit D and a circuit power source Vcc (DC power source).

Figure 2:
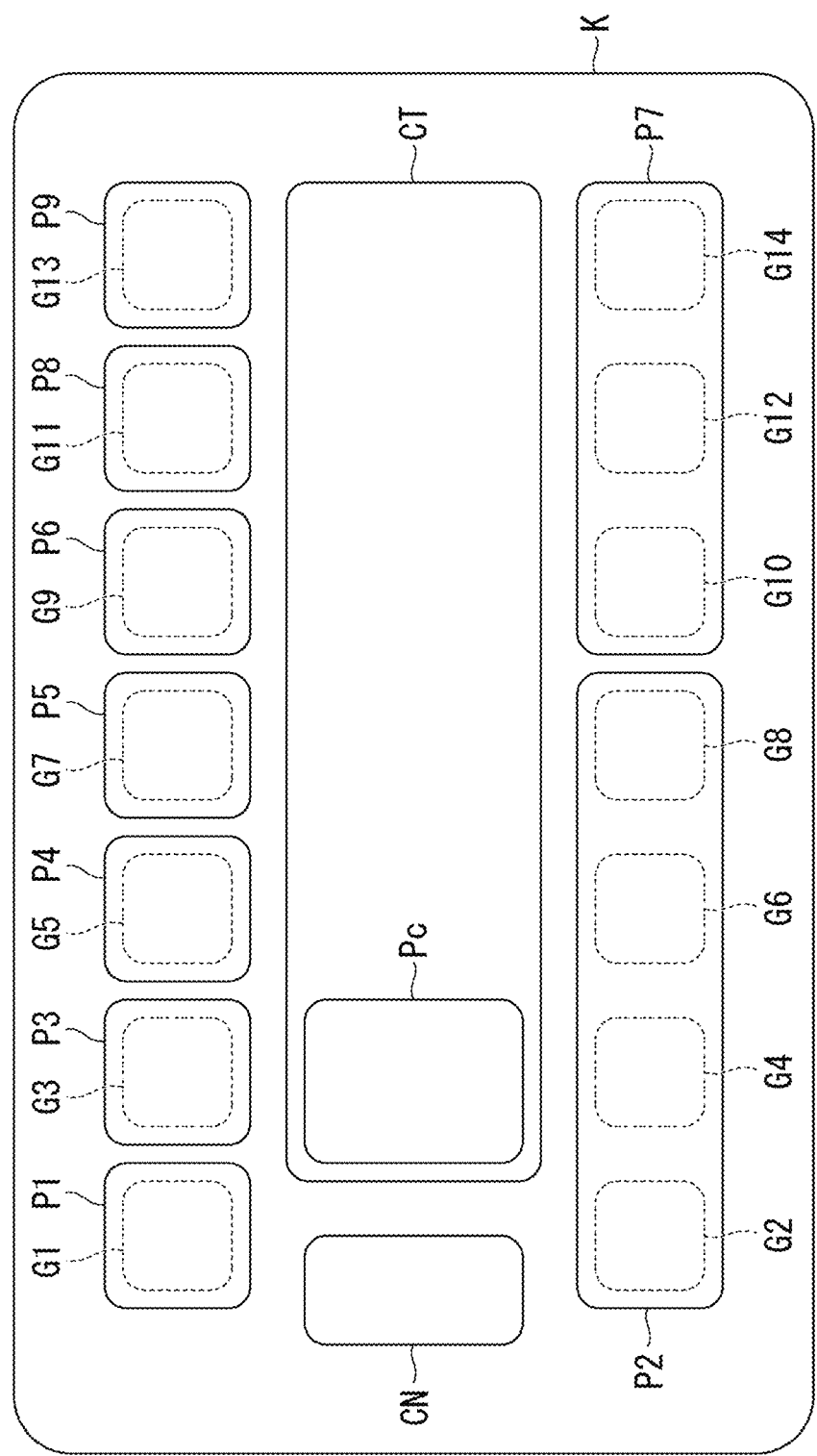
FIG. 2 is a schematic view illustrating a substrate layout in the first embodiment of the present invention.

For the sake of convenience, FIG. 1 illustrates only a detailed constitution of the first power source unit P1 supplying a DC power source to the first gate drive circuit G1. However, all the first to ninth power source units P1 to P9 (nine in total) have the same constitution. As illustrated in FIG. 2, the first power source unit P1 supplies a DC power source to the first gate drive circuit G1.

On the other hand, as illustrated in FIG. 2, the second power source unit P2 supplies a DC power source to four gate drive circuits. Namely, the second power source unit P2 supplies a DC power source to the second gate drive circuit G2, the fourth gate drive circuit G4, the sixth gate drive circuit G6, and the eighth gate drive circuit G8. In addition, the third power source unit P3 supplies a DC power source to the third gate drive circuit G3. The fourth power source unit P4 supplies a DC power source to the fifth gate drive circuit G5. The fifth power source unit P5 supplies a DC power source to the seventh gate drive circuit G7.

In addition, the sixth power source unit P6 supplies a DC power source to the ninth gate drive circuit G9. The seventh power source unit P7 supplies a DC power source to three gate drive circuits. Namely, the seventh power source unit P7 supplies a DC power source to the tenth gate drive circuit G10, the twelfth gate drive circuit G12, and the fourteenth gate drive circuit G14. Moreover, the eighth power source unit P8 supplies a DC power source to the eleventh gate drive circuit G11. The ninth power source unit P9 supplies a DC power source to the thirteenth gate drive circuit G13.

That is, the first power source unit P1, the third power source unit P3, the fourth power source unit P4, the fifth power source unit P5, the sixth power source unit P6, the eighth power source unit P8, and the ninth power source unit P9 of the first to ninth power source units P1 to P9 (nine in total) supply a DC power source to the single gate drive circuit. However, the second power source unit P2 supplies a DC power source to four gate drive circuits, and the seventh power source unit P7 supplies a DC power source to three gate drive circuits. The second power source unit P2 and the seventh power source unit P7 correspond to the power source units of the present invention.

Figure 3:
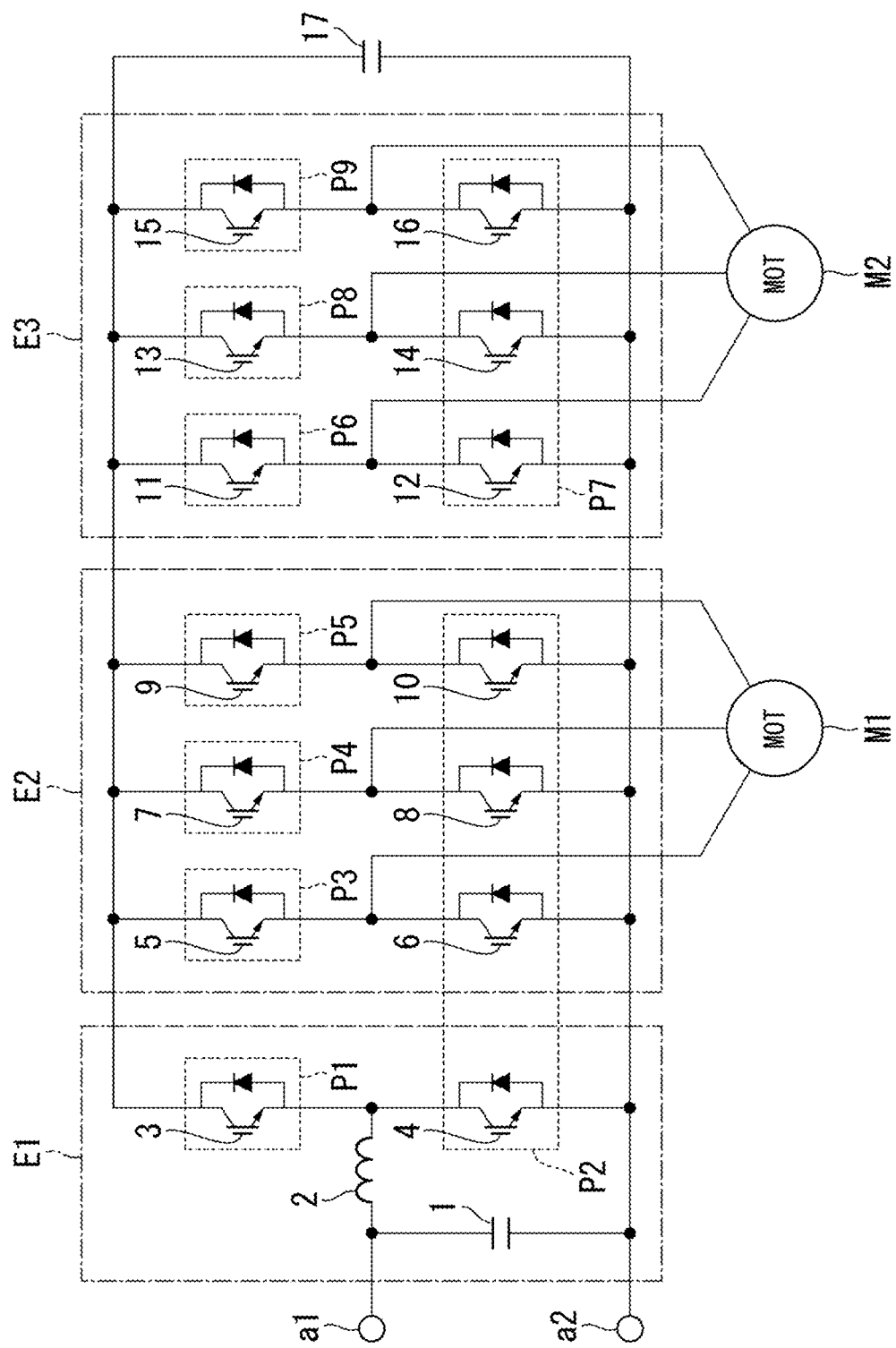
FIG. 3 is a schematic view illustrating a constitution of the gate driving power source device according to the first embodiment of the present invention and is a circuit diagram of a power conversion circuit in the first embodiment.

Here, the gate drive circuits G1 to G14 (fourteen in total) are drive circuits driving the power conversion devices illustrated in FIG. 3. For example, the power conversion devices are power control units (PCUs) mounted in a vehicle and are constituted of a step-up/down converter E1, a power generation converter E2 (regeneration converter), and a traveling inverter E3 (powering inverter). The power generation converter E2 and the traveling inverter E3 correspond to the AC/DC conversion circuits of the present invention.

Regarding such power conversion devices, the first gate drive circuit G1 and the second gate drive circuit G2 described above drive the step-up/down converter E1. The third to eighth gate drive circuits G3 to G8 drive the power generation converter E2. In addition, the ninth to fourteenth gate drive circuits G9 to G14 drive the traveling inverter E3.

The step-up/down converter E1 is a bidirectional step-up/down circuit and includes a first smoothing capacitor 1, a coil 2, an upper arm switching element 3 (step-up/down upper arm switching element), and a lower arm switching element 4 (step-up/down lower arm switching element) as illustrated in FIG. 3.

This step-up/down converter E1 has a step-up function of stepping up first DC power input to input/output ends a1 and a2 from the outside and outputting the first DC power to the traveling inverter E3 as second DC power and has a step-down function of stepping down the second DC power input from the power generation converter E2 or/and the traveling inverter E3 and outputting the second DC power to the input/output ends a1 and a2 as the first DC power. The step-up/down upper arm switching element 3 and the step-up/down lower arm switching element 4 described above are insulated gate bipolar transistors (IGBTs), for example.

In such a step-up/down converter E1, the step-up/down upper arm switching element 3 is driven by the first gate drive circuit G1 receiving supply of a power source from the first power source unit P1. In addition, the step-up/down lower arm switching element 4 is driven by the second gate drive circuit G2 receiving supply of a power source from the second power source unit P2.

The power generation converter E2 is a three-phase converter using a power generation motor M1 as a power supply source and includes three upper arm switching elements 5, 7, and 9 (AC/DC upper arm switching elements) and three lower arm switching elements 6, 8, and 10

(AC/DC lower arm switching elements). This power generation converter E2 converts AC power input from the power generation motor M1 into DC power and outputs the DC power to the step-up/down converter E1. The foregoing power generation motor M1 is a motor functioning as an AC generator.

In this power generation converter E2, the AC/DC upper arm switching element 5 and the AC/DC lower arm switching element 6 constitute a first switching leg. In addition, the AC/DC upper arm switching element 7 and the AC/DC lower arm switching element 8 constitute a second switching leg. Moreover, the AC/DC upper arm switching element 9 and the AC/DC lower arm switching element 10 constitute a third switching leg.

In such a power generation converter E2, the AC/DC upper arm switching element 5 is driven by the third gate drive circuit G3 receiving supply of a power source from the third power source unit P3. The AC/DC lower arm switching element 6 is driven by the fourth gate drive circuit G4 receiving supply of a power source from the second power source unit P2.

In addition, the AC/DC upper arm switching element 7 is driven by the fifth gate drive circuit G5 receiving supply of a power source from the fourth power source unit P4. The AC/DC lower arm switching element 8 is driven by the sixth gate drive circuit G6 receiving supply of a power source from the second power source unit P2.

Moreover, the AC/DC upper arm switching element 9 is driven by the seventh gate drive circuit G7 receiving supply of a power source from the fifth power source unit P5. The AC/DC lower arm switching element 10 is driven by the eighth gate drive circuit G8 receiving supply of a power source from the second power source unit P2. The AC/DC upper arm switching elements 5, 7, and 9 and the AC/DC lower arm switching elements 6, 8, and 10 described above are IGBTs, for example.

The traveling inverter E3 is a three-phase inverter which is driven using a traveling motor M2 as a load and includes three upper arm switching elements 11, 13, and 15 (AC/DC upper arm switching elements) and three lower arm switching elements 12, 14, and 16 (AC/DC lower arm switching elements). This power generation converter E2 converts the second DC power input from the step-up/down converter E1 into second AC power and outputs the second AC power to the traveling motor M2. The foregoing traveling motor M2 is a motor for driving wheels.

In this traveling inverter E3, the AC/DC upper arm switching element 11 and the AC/DC lower arm switching element 12 constitute a fourth switching leg. In addition, the AC/DC upper arm switching element 13 and the AC/DC lower arm switching element 14 constitute a fifth switching leg. Moreover, the AC/DC upper arm switching element 15 and the AC/DC lower arm switching element 16 constitute a sixth switching leg.

In such a traveling inverter E3, the AC/DC upper arm switching element 11 is driven by the ninth gate drive circuit G9 receiving supply of a power source from the sixth power source unit P6. The AC/DC lower arm switching element 12 is driven by the tenth gate drive circuit G10 receiving supply of a power source from the seventh power source unit P7.

In addition, the AC/DC upper arm switching element 13 is driven by the eleventh gate drive circuit G11 receiving supply of a power source from the eighth power source unit P8. The AC/DC lower arm switching element 14 is driven by the twelfth gate drive circuit G12 receiving supply of a power source from the seventh power source unit P7.

Moreover, the AC/DC upper arm switching element 15 is driven by the thirteenth gate drive circuit G13 receiving supply of a power source from the ninth power source unit P9. The AC/DC lower arm switching element 16 is driven by the fourteenth gate drive circuit G14 receiving supply of a power source from the seventh power source unit P7. The AC/DC upper arm switching elements 11, 13, and 15 and the AC/DC lower arm switching elements 12, 14, and 16 described above are IGBTs, for example.

Such a power conversion device includes a second smoothing capacitor 17 for outputting the second DC power. That is, in this second smoothing capacitor 17, one end is connected to one output end in the step-up/down converter E1 and the other end is connected to the other output end in the step-up/down converter E1, thereby smoothing an output of the step-up/down converter E1.

The power source drive circuit D includes a pulse generation circuit S and a drive transistor Tr. The pulse generation circuit S generates a pulse signal having a predetermined duty ratio in a predetermined cycle and outputs the pulse signal to a base terminal of the drive transistor Tr. In the drive transistor Tr, the base terminal is connected to an output end of the pulse generation circuit S, an emitter terminal is earthed, and a collector terminal is connected to one end of a primary winding in a transformer T1. Such a power source drive circuit D applies pulsed power (pulse power) to the input side of the first to ninth power source units P1 to P9, namely, the primary winding of each of the transformers of the first to ninth power source units P1 to P9 connected to each other in series.

The first power source unit P1 generates DC power having a predetermined voltage by causing the transformer T1 to perform voltage transformation of pulse power applied to the primary winding of the transformer T1 using such a power source drive circuit D and rectifying the pulse power using a rectification circuit, and outputs the DC power to the gate drive circuit G1 from both ends of a rectification capacitor C1.

In addition, similar to the first power source unit P1, the remaining second to ninth power source unit P2 to P9 also generate DC power having a predetermined voltage by causing the transformer to perform voltage transformation of pulse power applied to the primary winding of the transformer T1 using the power source drive circuit D and rectifying the pulse power using the rectification circuit, and output the DC power to the second to fourteenth gate drive circuits G2 to G14 from both ends of the rectification capacitor.

Here, the gate drive circuits G1 to G14 (fourteen in total) described above are uniformly controlled by a control circuit CT illustrated in FIG. 2. The first to ninth power source units P1 to P9 and the first to fourteenth gate drive circuits G1 to G14 have a power reception relationship regarding DC power as described above. However, the first to ninth power source units P1 to P9, the first to fourteenth gate drive circuits G1 to G14, and the control circuit CT are mounted on a single printed board K as illustrated in FIG. 2.

That is, the first, third, fourth, fifth, sixth, eighth, and ninth power source units P1, P3, P4, P5, P6, P8, and P9 supplying a DC power source to the first, third, fifth, seventh, ninth, eleventh, and thirteenth gate drive circuits G1, G3, G5, G7, G9, G11, and G13 driving the upper arm switching elements 3, 5, 7, 9, 11, 13, and 15; and the second power source unit P2 supplying a DC power source to the second, fourth, sixth, and eighth gate drive circuits G2, G4, G6, and G8 driving the lower arm switching elements 4, 6, 8, and 10 and the seventh power source unit P7 supplying a DC power source to the tenth, twelfth, and fourteenth gate drive circuits G12 and G14 driving the lower arm switching elements 12, 14, and 16 are disposed (laid out) such that the control circuit CT is sandwiched therebetween.

In more detail, the control circuit CT is disposed in an elongated shape at a central portion along the long side with respect to the printed board K having a rectangular shape. A connector CN for giving and receiving a power source and a signal with respect to the outside is disposed at an end portion of this control circuit CT. In addition, in the control circuit CT, a power source circuit Pc generating a power source for the control circuit CT is mounted in the vicinity of the connector CN.

The first, third, fourth, fifth, sixth, eighth, and ninth power source units P1, P3, P4, P5, P6, P8, and P9 are disposed in a row along the long side of the printed board K on one side of such a control circuit CT. Moreover, the second power source unit P2 and the seventh power source unit P7 are disposed in a row along the long side of the printed board K on the other side of the control circuit CT. That is, the first, third, fourth, and fifth power source units P1, P3, P4, and P5 are disposed in a state of facing the second power source unit P2 in the short side direction of the printed board K with the control circuit CT sandwiched therebetween. In addition, the sixth, eighth, and ninth power source units P6, P8, and P9 are disposed in a state of facing the seventh power source unit P7 in the short side direction of the printed board K with the control circuit CT sandwiched therebetween.

In addition, the foregoing printed board K is a multi-layer printed board in which pattern wirings are formed on at least both surfaces thereof. The first to fourteenth gate drive circuits G1 to G14 are mounted on one surface of the printed board K. The first to ninth power source units P1 to P9 are mounted on the other surface of the printed board K. That is, the first to fourteenth gate drive circuits G1 to G14 and the first to ninth power source units P1 to P9 supplying a DC power source to the first to fourteenth gate drive circuits G1 to G14 are mounted with a rear/front positional relationship in the printed board K.

More specifically, as illustrated in FIG. 2, the first gate drive circuit G1 and the first power source unit P1 are mounted with a rear/front positional relationship therebetween. The second, fourth, sixth, and eighth gate drive circuits G2, G4, G6, and G8 and the second power source unit P2 are mounted with a rear/front positional relationship therebetween. In addition, the third gate drive circuit G3 and the third power source unit P3 are mounted with a rear/front positional relationship therebetween. The fifth gate drive circuit G5 and the fourth power source unit P4 are mounted with a rear/front positional relationship therebetween. The seventh gate drive circuit G7 and the fifth power source unit P5 are mounted with a rear/front positional relationship therebetween.

In addition, the ninth gate drive circuit G9 and the sixth power source unit P6 are mounted with a rear/front positional relationship therebetween. The tenth, twelfth, and fourteenth gate drive circuits G12 and G14 and the seventh power source unit P7 are mounted with a rear/front positional relationship therebetween. Moreover, the eleventh gate drive circuit G11 and the eighth power source unit P8 are mounted with a rear/front positional relationship therebetween. The thirteenth gate drive circuit G13 and the ninth power source unit P9 are mounted with a rear/front positional relationship therebetween.

That is, in the first to fourteenth gate drive circuits G1 to G14 described above, the first gate drive circuit G1 corresponds to the step-up/down upper arm gate drive circuit of the present invention, and the second gate drive circuit G2 corresponds to the step-up/down lower arm gate drive circuit of the present invention. In addition, the third, fifth, seventh, ninth, eleventh, and thirteenth gate drive circuits G3, G5, G7, G9, G11, and G13 correspond to the AC/DC upper arm gate drive circuits of the present invention. The fourth, sixth, eighth, tenth, twelfth, and fourteenth gate drive circuits G4, G6, G8, G10, G12, and G14 correspond to the AC/DC lower arm gate drive circuits of the present invention.

Subsequently, elements of the first to ninth power source units P1 to P9 in detail will be described with reference to FIG. 1. However, all the first to ninth power source units P1 to P9 have the same constitution. Therefore, hereinafter, a detailed constitution of the first power source unit P1 will be representatively described.

The first power source unit P1 includes the transformer T1, a pair of diodes D11 and D12, and the rectification capacitor C1. The transformer T1 is a voltage transformer including the primary winding and a secondary winding. In this transformer T1, one end of the primary winding is connected to the output end of the power source drive circuit D, and the other end of the primary winding is connected to an input end of the second power source unit P2 on one side, namely, one end of the primary winding in a transformer (not illustrated) of the second power source unit P2.

In addition, in this transformer T1, one end of the secondary winding is connected to an anode terminal of the diode D11 on one side, and the other end of the secondary winding is connected to an anode terminal of the diode D12 on the other side. Moreover, in this transformer T1, an intermediate tap of the secondary winding is connected to the other end of the rectification capacitor C1.

In the diode D11 on one side of the pair of diodes D11 and D12, the anode terminal is connected to one end of the secondary winding of the transformer T1, and a cathode terminal is connected to a cathode terminal of the diode D12 on the other side and one end of the rectification capacitor C1. In the diode D12 on the other side, the anode terminal is connected to the other end of the secondary winding of the transformer T1, and the cathode terminal is connected to the cathode terminal of the diode D11 on one side and one end of the rectification capacitor C1.

In the rectification capacitor C1, one end is connected to each cathode terminal of the pair of diodes D11 and D12, and the other end is connected to the intermediate tap of the secondary winding in the transformer T1. Such a pair of diodes D11 and D12 and a rectification capacitor C1 constitute a rectification circuit rectifying pulse power (pulse voltage) input from the secondary winding of the transformer T1 and converting the pulse power (pulse voltage) into DC power (DC voltage).

In this gate driving power source device, as illustrated in FIGS. 2 and 3, a shared DC power source is supplied from the second power source unit P2 to the second gate drive circuit G2 driving the step-up/down lower arm switching element 4 and the fourth, sixth, and eighth gate drive circuits G4, G6, and G8 driving three AC/DC lower arm switching elements 6, 8, and 10.

Therefore, according to the first embodiment, compared to a case in which power source units are individually provided in the second gate drive circuit G driving the step-up/down converter E1 and the fourth, sixth, and eighth gate drive circuits G4, G6, and G8 driving the power generation converter E2, the mounting area (mounting volume) can be further reduced than that in the related art.

In addition, in this gate driving power source device, the AC/DC lower arm switching elements 6, 8, and 10 of the power generation converter E2 are grouped with respect to the step-up/down lower arm switching element 4 of the step-up/down converter E1, and a shared DC power source is supplied from the second power source unit P2. The AC/DC lower arm switching elements 12, 14, and 16 of the traveling inverter E3 are not grouped with respect to the step-up/down lower arm switching element 4 of the step-up/down converter E1.

The purpose of such grouping is that the traveling inverter E3 is a power conversion circuit driving the traveling motor M2, whereas the power generation converter E2 performs DC conversion of an output (AC power) of the power generation motor M1, and reliability of the traveling inverter E3 is more important than that of the power generation converter E2 when viewed as a PCU mounted in a vehicle. According to such a first embodiment, even when some abnormality occurs in the gate driving power source device, a vehicle can stably travel.

Moreover, according to the first embodiment, since a shared DC power source is supplied from the seventh power source unit P7 to the tenth, twelfth, and fourteenth gate drive circuits G10, G12, and G14 driving the three AC/DC lower arm switching elements 12, 14, and 16, compared to a case in which power source units are individually provided in the tenth, twelfth, and fourteenth gate drive circuits G10, G12, and G14 driving the traveling inverter E3, the mounting area (mounting volume) can be further reduced than that in the related art.

Second Embodiment

Figure 4:
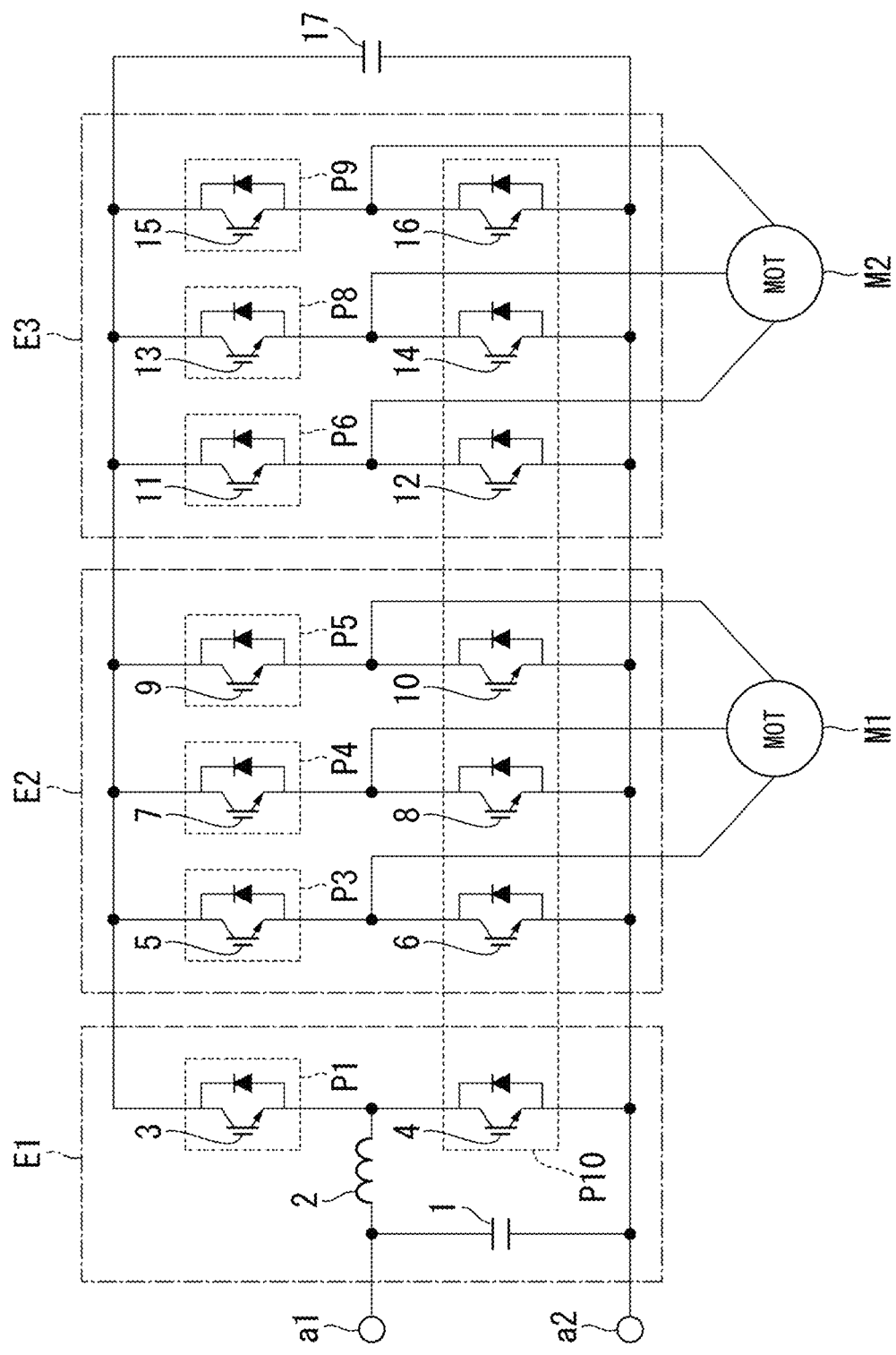
FIG. 4 is a schematic view illustrating a constitution of a gate driving power source device according to a second embodiment of the present invention.

Next, a second embodiment of the present invention will be described. In the gate driving power source device according to the second embodiment, as illustrated in FIG. 4, the circuit constitution of the power conversion device is the same as that of the first embodiment. In this FIG. 4, the same reference signs are applied to the same constituent elements of the first embodiment.

This gate driving power source device includes the first to fourteenth gate drive circuits G1 to G14 (fourteen in total), but the constitution of the power source unit supplying a DC power source to the first to fourteenth gate drive circuits G1 to G14 differs from that of the first embodiment. That is, this gate driving power source device includes a tenth power source unit P10 in addition to the first, third to sixth, eighth, and ninth power source units P1, P3 to P6, P8, and P9.

This tenth power source unit P10 supplies a DC power source to the gate drive circuits (seven in total). Namely, the tenth power source unit P10 supplies a DC power source to the tenth, twelfth, and fourteenth gate drive circuits G10, G12, and G14 in addition to the second, fourth, sixth, and eighth gate drive circuits G2, G4, G6, and G8. That is, in the first embodiment, a DC power source is supplied to the second, fourth, sixth, eighth, tenth, twelfth, and fourteenth gate drive circuits G2, G4, G6, G8, G10, G12, and G14 (seven in total) by two power source units, namely, the second and seventh power source units P2 and P7. However, in the second embodiment, a DC power source is supplied to the second, fourth, sixth, eighth, tenth, twelfth, and fourteenth gate drive circuits G2, G4, G6, G8, G10, G12, and G14 (seven in total) by the single tenth power source unit P10.

According to such a second embodiment, since the number of power source units is further reduced than that of the first embodiment, the mounting area (mounting volume) can be further reduced than that of the first embodiment.

Third Embodiment

Figure 5:
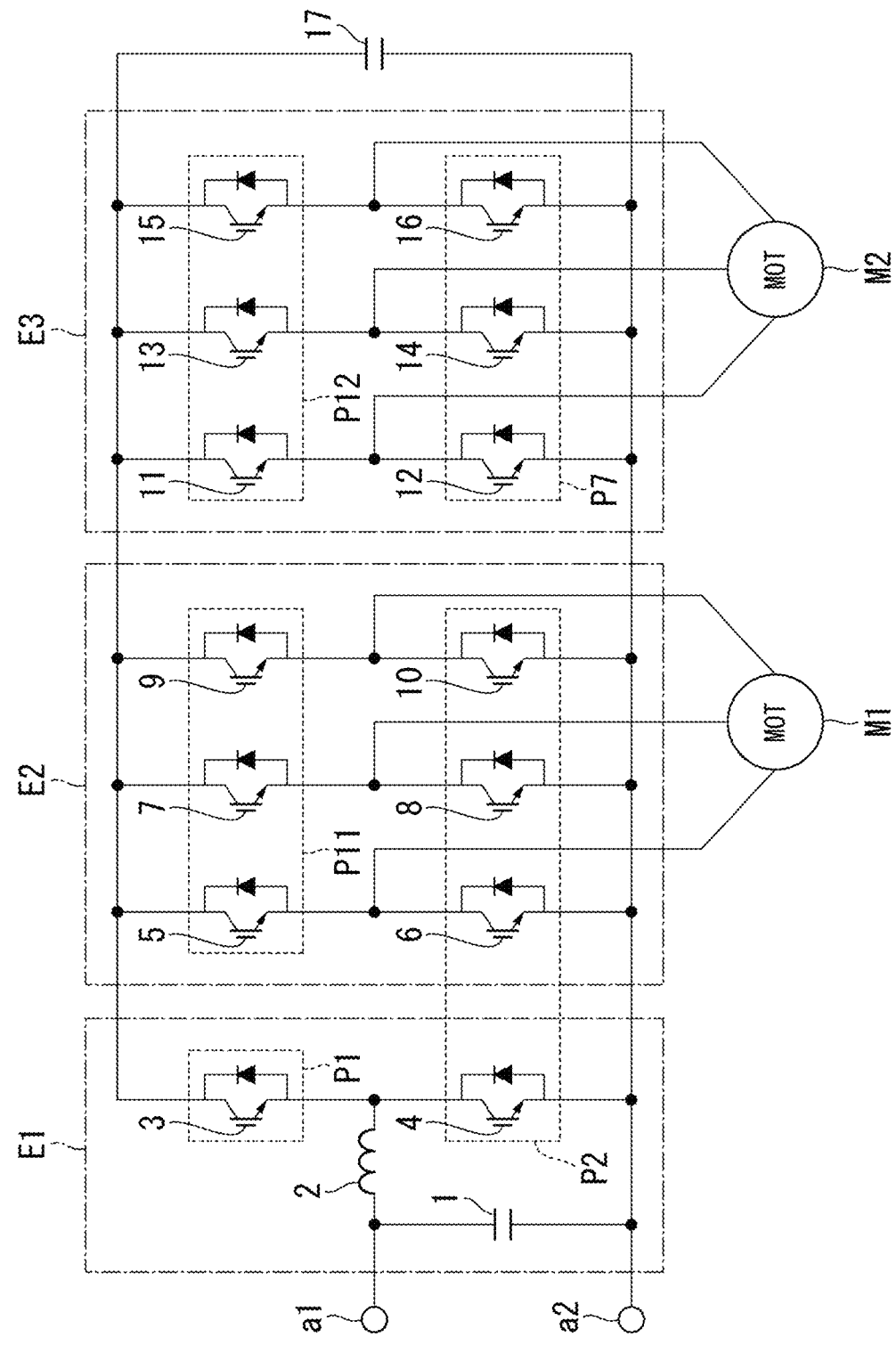
FIG. 5 is a schematic view illustrating a constitution of a gate driving power source device according to a third embodiment of the present invention.

Next, a third embodiment of the present invention will be described. In a gate driving power source device according to the third embodiment, as illustrated in FIG. 5, the circuit constitution of the power conversion device is the same as that of the first embodiment. In this FIG. 5, the same reference signs are applied to the same constituent elements of the first embodiment.

This gate driving power source device includes the first to fourteenth gate drive circuits G1 to G14 (fourteen in total), but the constitution of the power source unit supplying a DC power source to the first to fourteenth gate drive circuits G1 to G14 differs from those of the first and second embodiments. That is, this gate driving power source device includes an eleventh power source unit P11 and a twelfth power source unit P12 in addition to the first, second, and seventh power source units P1, P2, and P7.

The eleventh power source unit P11 supplies a DC power source to the gate drive circuits (three in total), namely, the third, fifth, and seventh gate drive circuits G3, G5, and G7 driving the power generation converter E2. On the other hand, the twelfth power source unit P12 supplies a DC power source to the gate drive circuits (three in total), namely, the third, fifth, and seventh gate drive circuits G3, G5, and G7 driving the traveling inverter E3.

Such an eleventh power source unit P11 and a twelfth power source unit P12 correspond to the second power source units of the present invention.

That is, in this third embodiment, a DC power source is supplied from the eleventh power source unit P11 to the third, fifth, and seventh gate drive circuits G3, G5, and G7 of the three AC/DC upper arm switching elements 5, 7, and 9 constituting the power generation converter E2. In addition, in this third embodiment, a DC power source is supplied from the twelfth power source unit P12 to the ninth, eleventh, and thirteenth gate drive circuits G9, G11, and G13 of the three AC/DC upper arm switching elements 11, 13, and 15 constituting the traveling inverter E3.

According to such a third embodiment, since the number of power source units is further reduced than that of the first embodiment, the mounting area (mounting volume) can be further reduced than that of the first embodiment.

Fourth Embodiment

Figure 6:
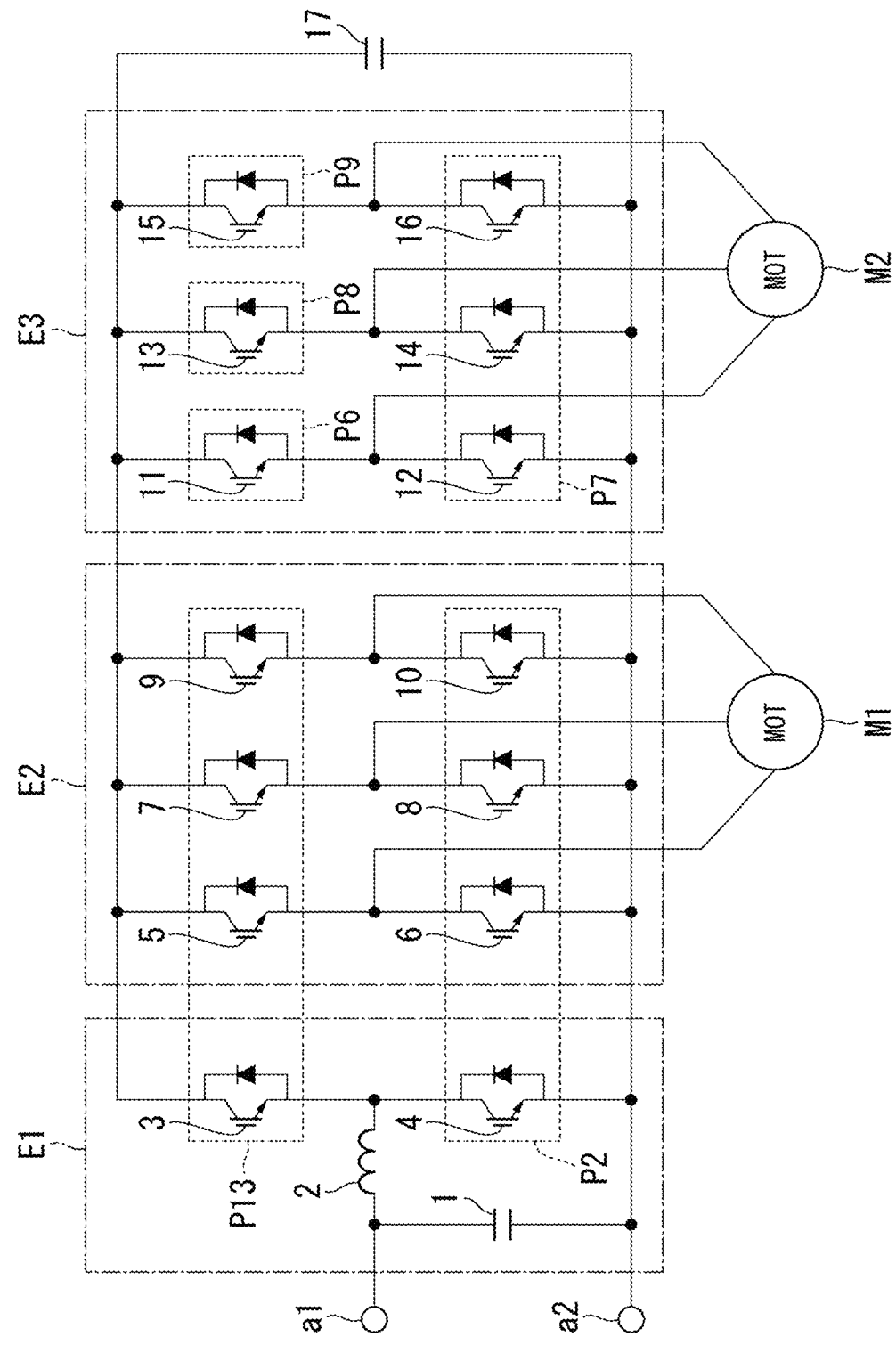
FIG. 6 is a schematic view illustrating a constitution of a gate driving power source device according to a fourth embodiment of the present invention.

Next, a fourth embodiment of the present invention will be described. In a gate driving power source device according to the fourth embodiment, as illustrated in FIG. 6, the circuit constitution of the power conversion device is the same as that of the first embodiment. In this FIG. 6, the same reference signs are applied to the same constituent elements of the first embodiment.

This gate driving power source device includes the first to fourteenth gate drive circuits G1 to G14 (fourteen in total), but the constitution of the power source unit supplying a DC power source to the first to fourteenth gate drive circuits G1 to G14 differs from those of the first to third embodiments. That is, this gate driving power source device includes a thirteenth power source unit P13 in addition to the second, sixth, seventh, eighth, and ninth power source units P2, P6, P7, P8, and P9.

The thirteenth power source unit P13 supplies a DC power source to the gate drive circuits (four in total), namely, the first gate drive circuit G1 driving the step-up/down converter E1 and the third, fifth, and seventh gate drive circuits G3, G5, and G7 driving the power generation converter E2.

That is, in this fourth embodiment, a DC power source is supplied from the thirteenth power source unit P13 to the first gate drive circuit G1 of the step-up/down upper arm switching element 3 constituting the step-up/down converter E1 and the third, fifth, and seventh gate drive circuits G3, G5, and G7 of the three AC/DC upper arm switching elements 5, 7, and 9 constituting the power generation converter E2.

According to such a fourth embodiment, since the number of power source units is further reduced than that of the first embodiment, the mounting area (mounting volume) can be further reduced than that of the first embodiment.

Fifth Embodiment

Figure 7:
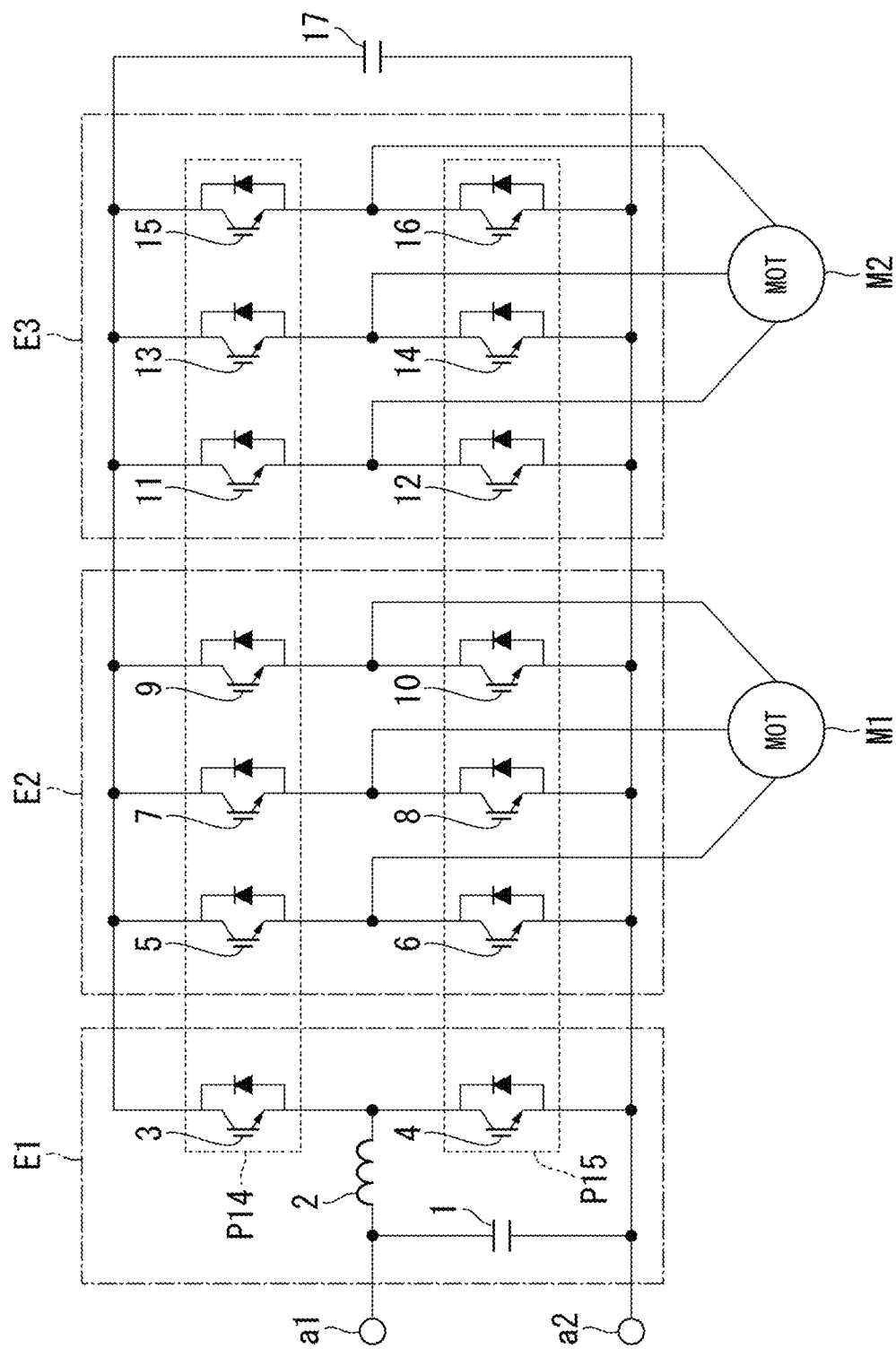
FIG. 7 is a schematic view illustrating a constitution of a gate driving power source device according to a fifth embodiment of the present invention.

Next, a fifth embodiment of the present invention will be described. In a gate driving power source device according to the fifth embodiment, as illustrated in FIG. 7, the circuit constitution of the power conversion device is the same as that of the first embodiment. In this FIG. 7, the same reference signs are applied to the same constituent elements of the first embodiment.

This gate driving power source device includes the first to fourteenth gate drive circuits G1 to G14 (fourteen in total), but the constitution of the power source unit supplying a DC power source to the first to fourteenth gate drive circuits G1 to G14 differs from those of the first to fourth embodiments. That is, this gate driving power source device includes a fourteenth power source unit P14 and a fifteenth power source unit P15.

The fourteenth power source unit P14 supplies a DC power source to the gate drive circuits (seven in total), namely, the first gate drive circuit G1 driving the step-up/down converter E1, the third, fifth, and seventh gate drive circuits G3, G5, and G7 driving the power generation converter E2, and the ninth, eleventh, and thirteenth gate drive circuits G3, G5, and G7 driving the traveling inverter E3.

On the other hand, the fifteenth power source unit P15 supplies a DC power source to the gate drive circuits (seven in total). Namely, the fifteenth power source unit P15 supplies a DC power source to the second gate drive circuit G2 driving the step-up/down converter E1, the fourth, sixth, and eighth gate drive circuits G4, G6, and G8 driving the power generation converter E2, and the tenth, twelfth, and fourteenth gate drive circuits G10, G12, and G14 driving the traveling inverter E3.

That is, in this fifth embodiment, a DC power source is supplied from the fourteenth power source unit P14 to the first gate drive circuit G1 for the step-up/down upper arm switching element 3 constituting the step-up/down converter E1, the third, fifth, and seventh gate drive circuits G3, G5, and G7 for the three AC/DC upper arm switching elements 5, 7, and 9 constituting the power generation converter E2, and the ninth, eleventh, and thirteenth gate drive circuits G9, G11, and G13 for the three AC/DC upper arm switching elements 11, 13, and 15 constituting the traveling inverter E3.

In addition, in this fifth embodiment, a DC power source is supplied from the fifteenth power source unit P15 to the second gate drive circuit G2 for the step-up/down lower arm switching element 4 constituting the step-up/down converter E1, the fourth, sixth, and eighth gate drive circuits G4, G6, and G8 for the three AC/DC lower arm switching elements 6, 8, and 10 constituting the power generation converter E2, and the tenth, twelfth, and fourteenth gate drive circuits G10, G12, and G14 for the three AC/DC lower arm switching elements 12, 14, and 16 constituting the traveling inverter E3.

According to such a fifth embodiment, since the number of power source units is further reduced drastically than that of the first embodiment, the mounting area (mounting volume) can be further reduced drastically than that of the first embodiment.

The present invention is not limited to the foregoing embodiments. For example, the following modification examples can be considered.

(1) In the foregoing first to fifth embodiments, five patterns of a relationship for giving and receiving a DC power source with respect to the first to fourteenth gate drive circuits G1 to G14 (fourteen in total) have been described, but the present invention is not limited thereto.

The present invention aims to reduce the number of power source units and thereby further reduce the mounting area (mounting volume) than that in the related art by supplying a shared DC power source to at least two of the step-up/down upper arm switching element, the step-up/down lower arm switching element, the AC/DC upper arm switching element, and the AC/DC lower arm switching element. Therefore, as long as a power source unit supplying a shared DC power source to a plurality of gate drive circuits is provided, other forms may be adopted.

(2) In the foregoing first to fifth embodiments, the power conversion device including the step-up/down converter E1, the power generation converter E2, and the traveling inverter E3 has been described, but the constitution of the power conversion device is not limited thereto. For example, the present invention can also be applied to a power conversion device including only the step-up/down converter E1 and the traveling inverter E3 or/and a power conversion device including only the power generation converter E2 and the traveling inverter E3.

In addition, when a vehicle includes a traveling assistant motor in place of the power generation motor M1, a traveling assistance converter may be provided in place of the power generation converter E2. Moreover, the number of power conversion circuits constituting the power conversion device is not limited to three or two as described above, and four or more power conversion circuits may be adopted.

(3) In the foregoing first to fifth embodiments, a detailed constitution of the gate driving power source device has been described using FIG. 1, but the present invention is not limited thereto. The gate driving power source device according to the present invention may have other detailed constitutions.

For example, the first to ninth power source units P1 to P15 (fifteen in total) described above employ a circuit form of a forward-type converter, but a fly-back-type converter may be employed. In addition, there is no need for all the first to ninth power source units P1 to P15 to employ the same circuit form, and the power source units may individually employ circuits having different forms. Moreover, the first to ninth power source units P1 to P9 (nine) described above are driven by the single power source drive circuit D. However, in place thereof, a power source drive circuit may be individually provided for each power source unit.

INDUSTRIAL APPLICABILITY

According to the present invention, regarding a gate driving power source device, a mounting area (mounting volume) can be made smaller than that in the related art.

REFERENCE SIGNS LIST

E1 Step-up/down converter
E2 Power generation converter (regeneration converter)
E3 Traveling inverter (powering inverter)
G1 First gate drive circuit (step-up/down upper arm gate drive circuit)
G2 Second gate drive circuit (step-up/down lower arm gate drive circuit)
G3 Third gate drive circuit (AC/DC conversion upper arm gate drive circuit)
G4 Fourth gate drive circuit (AC/DC conversion lower arm gate drive circuit)
G5 Fifth gate drive circuit (AC/DC conversion upper arm gate drive circuit)
G6 Sixth gate drive circuit (AC/DC conversion lower arm gate drive circuit)
G7 Seventh gate drive circuit (AC/DC conversion upper arm gate drive circuit)
G8 Eighth gate drive circuit (AC/DC conversion lower arm gate drive circuit)
G9 Ninth gate drive circuit (AC/DC conversion upper arm gate drive circuit)
G10 Tenth gate drive circuit (AC/DC conversion lower arm gate drive circuit)
G11 Eleventh gate drive circuit (AC/DC conversion upper arm gate drive circuit)
G12 Twelfth gate drive circuit (AC/DC conversion lower arm gate drive circuit)
G13 Thirteenth gate drive circuit (AC/DC conversion upper arm gate drive circuit)
G14 Fourteenth gate drive circuit (AC/DC conversion lower arm gate drive circuit)
K Printed board
M1 Power generation motor
M2 Traveling motor
P1 First power source unit
P2 Second power source unit
P3 Third power source unit
P4 Fourth power source unit
P5 Fifth power source unit
P6 Sixth power source unit
P7 Seventh power source unit
P8 Eighth power source unit
P9 Ninth power source unit
P10 Tenth power source unit
P11 Eleventh power source unit
P12 Twelfth power source unit
P13 Thirteenth power source unit
P14 Fourteenth power source unit
P15 Fifteenth power source unit
T1 Transformer
D11, D12 Diode
C1 Rectification capacitor
D Power source drive circuit
S Pulse generation circuit
Tr Drive transistor
1 First smoothing capacitor
2 Coil
3 Upper arm switching element (step-up/down upper arm switching element)
4 Lower arm switching element (step-up/down lower arm switching element)
5, 7, 9 Upper arm switching element (AC/DC upper arm switching element)
6, 8, 10 Lower arm switching element (AC/DC lower arm switching element)
11, 13, 15 Upper arm switching element (AC/DC upper arm switching element)
12, 14, 16 Lower arm switching element (AC/DC lower arm switching element)
17 Second smoothing capacitor

The invention claimed is:

1. A power conversion system that generates a bidirectional buck/boost power flow, the system comprising:
a power conversion device which includes a step-up/down converter including a step-up/down upper arm switching element and a step-up/down lower arm switching element, and one or a plurality of AC/DC conversion circuits including an AC/DC upper arm switching element and an AC/DC lower arm switching element, and
a gate driving power source device individually supplying a DC power source to a plurality of gate drive circuits provided for the power conversion device,
wherein the gate driving power source device includes:
a power source unit that supplies a shared DC power source to at least two of the step-up/down upper arm switching element, the step-up/down lower arm switching element, the AC/DC upper arm switching element, and the AC/DC lower arm switching element, and
a second power source unit that supplies the shared DC power source to the step-up/down upper arm switching element and the AC/DC upper arm switching element,
wherein a control circuit controlling the power source unit, the second power source unit, and the gate drive circuit is mounted on a single printed board such that the control circuit is sandwiched between the power source unit and the second power source unit,
wherein the printed board is a multi-layer printed board in which pattern wirings are formed on at least both surfaces thereof,
wherein a step-up/down lower arm gate drive circuit driving the step-up/down lower arm switching element and an AC/DC lower arm gate drive circuit driving the AC/DC lower arm switching element, and the power source unit are mounted with a rear/front positional relationship therebetween, and
wherein a step-up/down upper arm gate drive circuit driving the step-up/down upper arm switching element and an AC/DC upper arm gate drive circuit driving the AC/DC upper arm switching element, and the second power source unit are mounted with a rear/front positional relationship therebetween.

2. The power conversion system according to claim 1, wherein the power source unit supplies the shared DC power source to the step-up/down lower arm switching element and one or a plurality of the AC/DC lower arm switching elements.

3. The power conversion system according to claim 1, wherein the AC/DC conversion circuit includes
a powering inverter which converts DC power input from the step-up/down converter into AC power and supplies the AC power to a load, and
a regeneration converter which converts AC power that is an output of an AC generator into DC power and outputs the DC power to the step-up/down converter.

4. The power conversion system device according to claim 1, wherein the AC/DC conversion circuit includes the three-phase AC/DC upper arm switching element and the three-phase AC/DC lower arm switching element.

\* \* \* \* \*